United States Patent

Füssel et al.

[11] Patent Number: 5,959,722
[45] Date of Patent: Sep. 28, 1999

[54] REPRODUCTION OF TRANSPARENT MASTERS

[75] Inventors: Markus Füssel, München; Günter Findeis, Sauerlach; Friedrich Jacob, München; Knut Oberhardt, Föching, all of Germany

[73] Assignee: AGFA-Gevaert AG, Leverkusen, Germany

[21] Appl. No.: 08/918,221

[22] Filed: Aug. 25, 1997

[30] Foreign Application Priority Data

Aug. 23, 1996 [DE] Germany .................. 196 34 148

[51] Int. Cl.⁶ .................. G03B 27/72; G03B 27/32; G03C 5/00; G03F 9/00
[52] U.S. Cl. .................. 355/64; 355/35; 355/71; 430/22; 430/30
[58] Field of Search .................. 355/35, 40, 71, 355/74, 69

[56] References Cited

U.S. PATENT DOCUMENTS 5,770,337   6/1998   Chiang .................. 430/22

OTHER PUBLICATIONS

DeForest, William S. Photoresist: materials and process, Book, pp. 232–237, 1975.

Primary Examiner—Safet Metjahic
Assistant Examiner—Peter Kim
Attorney, Agent, or Firm—Darby & Darby

[57] ABSTRACT

A copying apparatus is adjusted in order to produce high-quality copies of transparent negatives or diapositives having excessive variations in brightness. The adjustment is performed using a reference master. The apparatus is properly adjusted when a copy of the reference master meets specific criteria.

35 Claims, 3 Drawing Sheets

REPRODUCTION OF TRANSPARENT MASTERS

BACKGROUND OF THE INVENTION

The invention relates to the reproduction of masters or originals.

Masters or originals in the form of photographs frequently exhibit large variations in brightness. Paper copies or prints of such masters are overexposed in the light areas or underexposed in the dark areas. As a result, details and fine structures are poorly visible, or no longer visible, in the copies.

To improve the quality of a copy made from a master with large variations in brightness, the German Patent Publication No. 40 40 498 proposes to mask the master with an unsharp mask. The unsharp mask reduces the overall contrast while providing greater contrast for the details. This is different from a sharp mask which makes the edges sharper but decreases the contrast for the details. The German Patent Publication teaches a mask with very low resolution, i.e., a mask which produces a very unsharp image of the master.

It has been found that the method of the German Patent Publication yields outstanding results with certain copiers or printers but that these results depend on a number of parameters other than the degree of unsharpness of the mask. For example, highly directional copy light tends to reduce copy quality. Good copy quality can be maintained by increasing the unsharpness of the mask. Alternatively, the reduction in copy quality can be corrected by changing from one objective to another having a different aperture angle. Likewise, the distance between master and copy material, the distance between mask and master, and the gamma of the copy material all affect copy quality.

No quantifiable relationship between these parameters is known.

SUMMARY OF THE INVENTION

It is an object of the invention to provide a method which allows different copying parameters to be adjusted relative to one another in such a manner that quality copies of reduced contrast can be obtained.

Another object of the invention is to provide a system which makes it possible to adjust different copying parameters relative to each other such that quality copies of decreased contrast can be produced.

The preceding objects, as well as others which will become apparent as the description proceeds, are achieved by the invention.

One aspect of the invention resides in a method of copying transparent masters. The method comprises the steps of providing at least one reference master, and establishing at least one mask.

The reference master has a diagonal of predetermined length, a first pair of light and dark areas, and a second pair of light and dark area. Each area of the first pair has a width equal or approximately equal to a first percentage of the diagonal length, and each area of the second pair has a width equal or approximately equal to a second percentage of the diagonal length. The second percentage is smaller than the first percentage.

The mask has a predetermined density, and the dark areas of the first and second pairs each have a density equal or approximately equal to the sum of the mask density and a first addend. The light areas of the first and second pairs each have a density equal or approximately equal to the sum of the mask density and a second addend smaller than the first addend.

In one embodiment, the method further comprises the step of establishing copying parameters such that, in a copy of the reference master made with the copying parameters, a first density difference is smaller than a second density difference. The first density difference is the density difference between areas of the copy corresponding to the first pair of areas of the reference master while the second density difference is the density difference between areas of the copy corresponding to the second pair of areas of the reference master. Preferably, the ratio of the first density difference to the second density difference is equal to or less than 0.8.

In another embodiment, the method additionally comprises the step of establishing copying parameters such that, in a copy of the reference master made with these copying parameters, the ratio of the first density difference to the second density difference is equal to or greater than 0.95.

The copying parameters may be established by adjusting components of an apparatus for the copying of transparent masters.

Another aspect of the invention resides in a system for copying transparent masters. The system comprises means for establishing a mask of predetermined density, and means for generating copies of masters. The generating means is adjusted such that copies of the reference master defined above have at least one selected characteristic.

In one embodiment of the system, the generating means is adjusted so that, in a copy of the reference master made by the generating means, the first density difference is smaller than the second density difference. It is preferred that the ratio of the first density difference to the second density difference be equal to or less than 0.8.

In another embodiment of the system, the generating means is adjusted in such a manner that, in a copy of the reference master made by the generating means, the ratio of the first density difference to the second density difference is equal to or greater than 0.95.

Setting of the copying parameters in accordance with the invention allows copies of excellent quality and lower contrast to be formed with a high degree of reproducibility. The invention is applicable to conventional copiers or printers in which a transparent master is illuminated and an image of the master is projected directly onto copy material such as copy paper. The invention is also applicable to digital copiers or printers in which a master is scanned electronically and an image of the master is subsequently formed on copy material point-by-point or line-by-line, e.g., by means of a laser or a cathode ray tube. Although the copying parameters in the two types of copiers may be different, adjustment of the copying parameters in each type of copier takes place in the same way.

The reference master may include an additional dark area, and the density of the additional dark area may serve as an indicator as to whether or not the large-area contrast of a copy, that is, the contrast of larger areas, is to be reduced relative to the contrast of the details. The indicator density will normally differ for different types of masters. Thus, for a normal negative, it has been found advantageous to reduce the large-area contrast when the indicator density is greater than the mask density plus 1.3. However, an indicator density equal to or less than the mask density plus 2.5 worsens the results for a diapositive where a reduction in the large-area contrast should be undertaken only when the indicator density exceeds the mask density plus 2.5.

The magnitude of the reduction in the large-area contrast depends partly on the magnitude of the large-area contrast in the master and partly on the perception of a person seeing a copy of the master. For instance, when copying a negative with a dark area having a density approximately equal to the mask density plus 1.9, the reduction in large-area contrast is greater than for a negative having a dark area whose density approximates the mask density plus 1.3.

If a negative has a dark area with a density less than the mask density plus 1.2, a copy of the negative generally cannot be improved by reducing the large-area contrast. The same holds true for a diapositive with a dark area whose density is less than the mask density plus 2.4. Whether the reduction in large-area contrast is abrupt or gradually approaches zero at densities away from these limits is left to personal taste.

Additional features and advantages of the invention will be forthcoming from the following detailed description of preferred embodiments when read in conjunction with the accompanying drawings.

DESCRIPTION OF THE PREFERRED EMBODIMENTS

Figure 1:
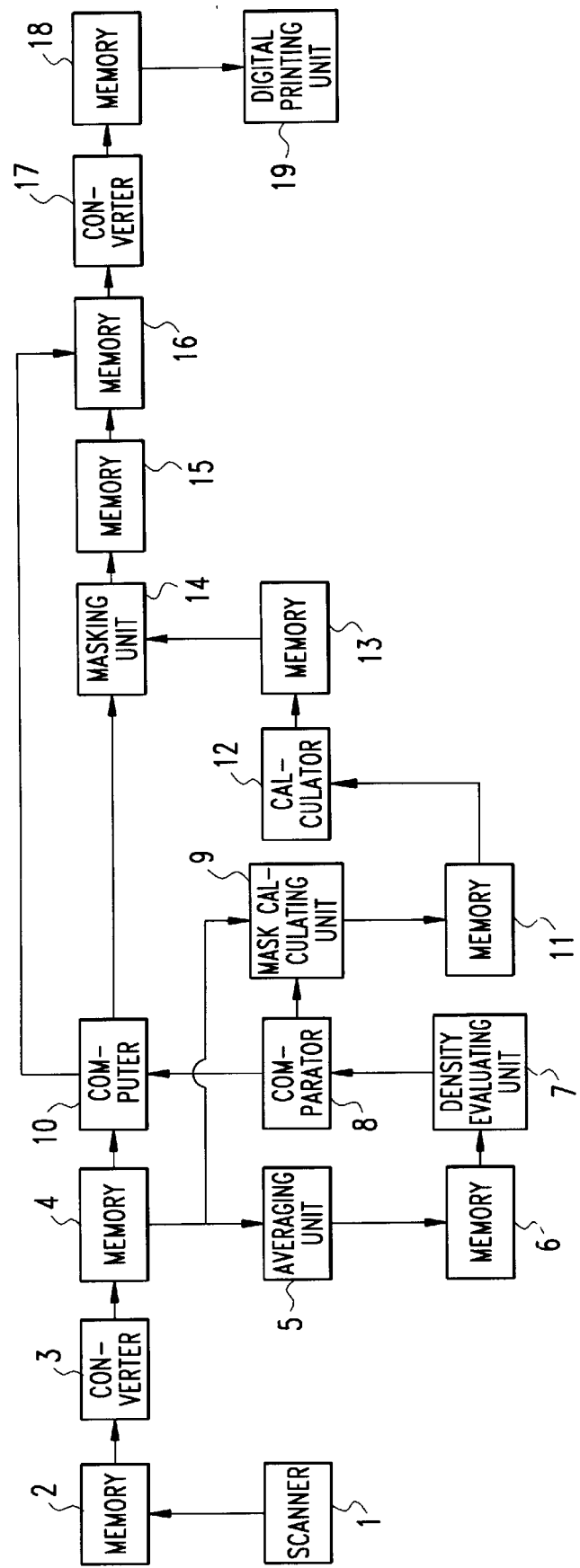
FIG. 1 is a block diagram of one embodiment of a copying apparatus.

FIG. 1 illustrates a digital copying apparatus or printer for making copies or prints of transparent masters. The masters, which can be negatives or diapositives, may constitute the frames of films.

The apparatus includes a scanner 1 which can, for instance, include a linear array of CCDs. The scanner 1 is designed to scan each master at a multiplicity of points arranged in lines and rows, and scanning is carried out at high resolution. By way of example, a frame of a conventional 135 mm film is scanned along lines and rows at a resolution of 2000 points×3000 points. At every point, density values are generated for each of the primary colors red, green and blue.

If scanning is performed at 8 bits, 256 degrees of luminosity with luminosity values of 0 thru 255 are obtained for each point and each primary color. To avoid undefined expressions in subsequent calculations, the luminosity value of 0 is increased to 1 so that 255 degrees of luminosity remain for each color and each point.

The values generated during scanning are entered in a memory 2. Red, green and blue signals are retrieved from the memory 2 and sent to a converter 3 which converts these color signals into two chrominance signals and a luminance signal. The chrominance and luminance signals are stored in a memory 4 as sharp chrominance and luminance images.

The luminance image corresponding to a master is used to determine the magnitude of the density variation in the master and whether masking would have a positive effect on a copy or print of the master. The magnitude of the density variation should not be established by comparing the brightest point of the master with the darkest point. For example, this would cause a master with serene scene containing small, very bright points representing stars, lights or reflections from a body of water to be masked with a resultant loss in brilliance. Accordingly, the density differences between large areas should be examined.

To this end, an averaging unit 5 calculates a floating average over selected points of the luminance image stored in the memory 4. Assuming that the points of the luminance image are stored as a two-dimensional matrix in which the points are assigned intensity values $y_{i,j}$ representing $y_{1,1}$, $y_{1,2}$ ... and $y_{2,1}$, $y_{2,2}$ ..., the averaging unit 5 calculates new intensity values $y'_{i,j}$ as follows:

$$y'_{i,j} = \frac{1}{(2m+1)^2} \sum_{k=i-m}^{k=i+m} \sum_{l=j-m}^{l=j+m} y_{k,l}$$

The square of the factor (2m+1) represents the number of points over which averaging is performed. The value of m should be chosen so that at least the points in the middle of a dark area or region are retained together with their original values. For a scanning resolution of 2000 points×3000 points, good results are obtained when m=40.

The averaging operation yields an unsharp luminance image whose points have intensity values $y'_{i,j}$, and the values $y'_{i,j}$ are entered in a memory 6. The brightest and darkest points of the unsharp luminance image are determined in a density evaluating unit 7. If the intensity value associated with the brightest point is $y'_1$ and the intensity value associated with the darkest point is $y'_d$, the ratio $y'_1/y'_d$ is a measure of the density range or contrast of the unsharp luminance image. This quotient is compared with a reference value K in a comparator 8. The reference value K represents a boundary beyond which a master should be masked. The reference value K is a function of the number m which, as indicated above, is a measure of the number of points used for averaging. When m=40, a suitable value for K is 7.

If the contrast or density range of the unsharp luminance image, as represented by the quotient $y'_1/y'_d$, is found to be smaller than 7, the comparator 8 decides that the master is to be copied unmasked, and this information is transmitted to a computer 10. On the other hand, should the contrast be equal to or greater than 7, the comparator 8 decides that the master is to be masked during copying.

In the latter case, a raw mask is calculated in a mask calculating unit 9. The raw mask is in the form of a set of intensity values $y''_{i,j}$ which, like the intensity values $y'_{i,j}$ for the unsharp luminance image, are calculated using floating averages. The calculating unit 9 calculates the raw mask as follows:

$$y''_{i,j} = \frac{1}{(2n+1)^2} \sum_{k=i-n}^{k=i+n} \sum_{l=i-n}^{l=i+n} y_{k,l}$$

The raw mask derived in the calculating unit 9 constitutes a second unsharp luminance image. The square of the term (2n+1) represents the number of points over which averaging is carried out. When m=40 and K=7, a value of n=50 has been found satisfactory.

The intensity values $y''_{i,j}$ for the raw mask are entered in a memory 11. Since the purpose of masking is to brighten areas of a master which are too dark and to darken areas of a master which are too bright, the mask must be the inverse of the master. Hence, the raw mask stored in the memory 11 must be inverted. Moreover, the mask should be designed so that the brightest point of the mask causes no darkening of the master. To this end, the mask must be normalized. Furthermore, the gradation or gamma of the mask is to be taken into account.

The inversion, normalization and gradation adjustment of the mask are performed in a calculator 12 using a single calculation. The calculator 12 calculates the intensity values $y'''_{i,j}$ for the points of the final mask as follows:

$$y'''_{i,j} = 255\left(\frac{y''_d}{y''_{i,j}}\right)^\gamma$$

In the preceding equation, $y''_d$ represents the intensity value for the darkest point of the raw mask stored in the memory 11 while gamma represents a gradation factor. A gradation factor of 0.5 has been found to work very well when m=40, K=7 and n=50. The intensity values $y'''_{i,j}$ for the final mask are entered in a memory 13.

The original sharp luminance image stored in the memory 4 is corrected in the computer 10 if necessary. The final mask stored in the memory 13 is thereupon superimposed on the original luminance image in a masking unit 14. To this end, the intensity value for each point of the original luminance image is multiplied by the intensity value for the corresponding point of the final mask in the memory 13. The product is divided by 255, which constitutes the largest degree of luminosity, and the resulting value is multiplied by a term which normalizes such value. These operations, which are performed by the masking unit 14 and yield intensity values $y''''_{i,j}$ representing the masked luminance image, are expressed mathematically as follows:

$$y''''_{i,j} = \frac{y_{i,j}y'''_{i,j}}{255}\cdot\left(\frac{255}{y''_d}\right)^\gamma$$

The intensity values $y''''_{i,j}$ for the masked luminance image are entered in a memory 15.

To produce a copy of the master associated with the masked luminance image, this image must be united with the two chrominance images derived from the master. A memory 16 of the same type as the memory 4 is provided for this purpose.

As mentioned previously, the original sharp luminance image stored in the memory 4 is corrected in the computer 10 if necessary. The same is true for the two chrominance images stored in the memory 4.

If the comparator 8 determines that the master is to be copied unmasked, the two chrominance images, as well as the original sharp luminance image, are sent from the computer 10 directly to the memory 16. On the other hand, if the comparator 8 determines that the master is to be masked during copying, the computer 10 transmits only the two chrominance images to the memory 16. Instead of the original sharp luminance image, the memory 16 here receives the masked luminance image from the memory 15.

A converter 17 transforms the chrominance and luminance images stored in the memory 16 into red, green and blue signals which are entered in a memory 18 of the same type as the memory 2. The red, green and blue signals are sent to a digital copying or printing unit 19 which uses the signals to make a copy of the master on copy material, e.g., conventional CN paper.

The procedure described above assumes that the master is a negative. Should the master be a diapositive, the signals which drive the copying unit 19 must additionally be inverted in a known manner.

Figure 2:
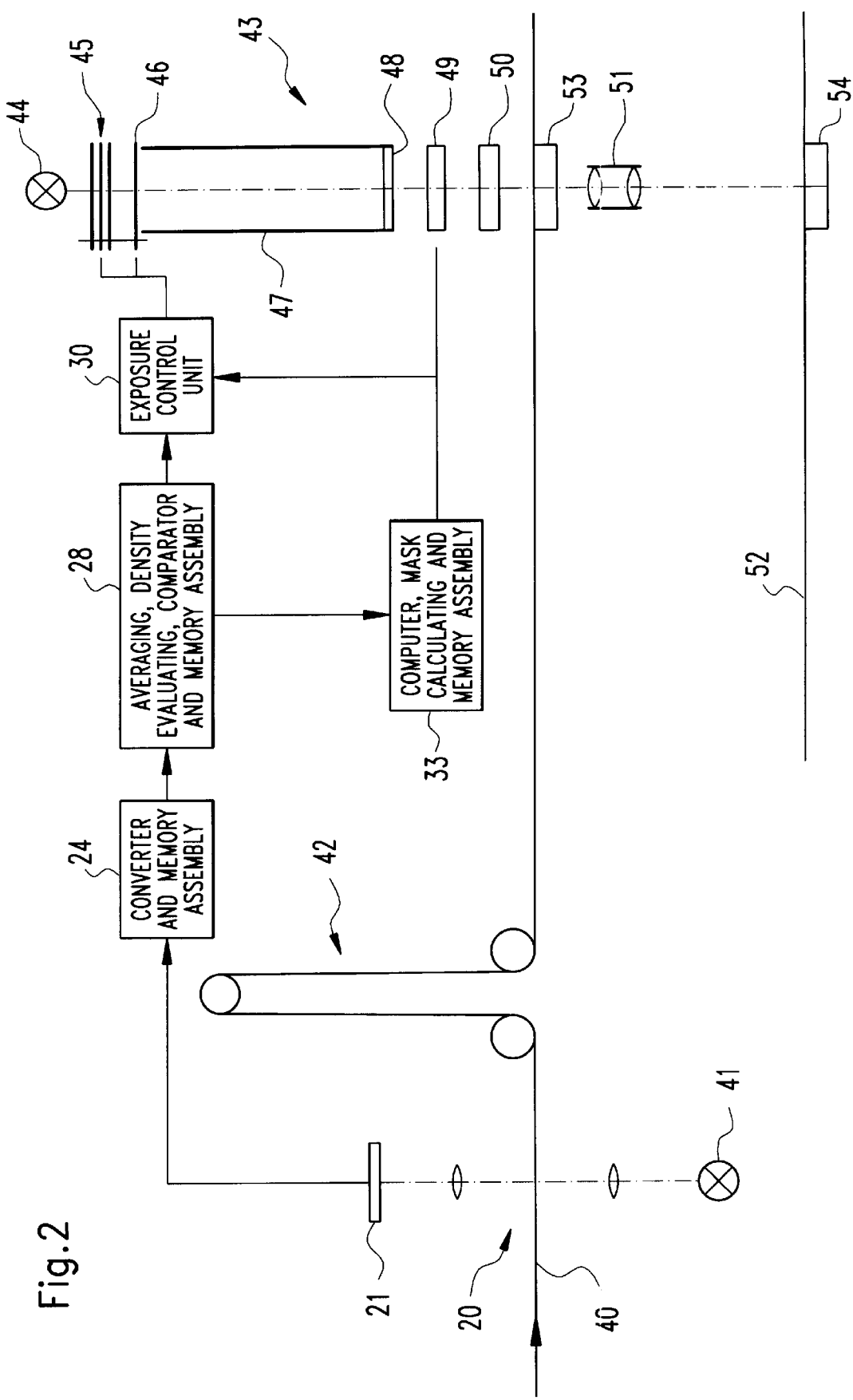
FIG. 2 schematically illustrates another embodiment of a copying apparatus.

The apparatus of FIG. 1 is a digital copying or printing apparatus. FIG. 2 shows a copying or printing apparatus which, in contrast, operates with conventional direct or integral illumination of masters.

Referring to FIG. 2, an exposed and developed transparent film 40 is transported from left to right. The film 40 first passes through a scanner 20 having a light source or illumination source 41 and a sensor 21. The sensor 21 may, for example, be constituted by a two-dimensional or linear array of CCDs. The scanner 20 can have a substantially lower resolution than the scanner 1 of FIG. 1, e.g., a resolution of 400 pixels×600 pixels.

Downstream of the scanner 20, the film 40 forms a loop 42 of variable length. The loop 42 serves as a temporary storage device which allows at least the major part of the film 40 to be scanned before the leading frame of the film 40 enters a copying station 43. Furthermore, the film 40 travels through the scanner 20 continuously and through the copying station 43 in steps, and the loop 42 further serves as a buffer which compensates for the different rates of movement of the film 40 through the scanner 20 and the copying station 43.

The copying station 43 has a platform or support 53 on which a frame of the film 40 rests while being copied. The copying station 43 is also provided with a platform or support 54 for a section of copy material 52. During copying, an image of the frame on the platform 53 is projected onto the section of copy material 52 overlying the platform 54.

In order to project an image of a frame onto the copy material 52, the frame is illuminated by a lamp or illumination source 44. Between the lamp 44 and the platform 53 are a set of color filters 45, a shutter 46, a reflecting tube 47, an LCD display 49 and a diffusing disk 50. The end of the reflecting tube 47 facing the lamp 44 has an opening for the admission of light into the tube 47. The opposite end of the reflecting tube 47, which faces the platform 53, has an opening for the discharge of light from the tube 47. A second diffusing disk 48 is mounted in the discharge opening of the reflecting tube 47.

Light which travels from the lamp 44 to a frame on the platform 53 passes through the frame to an objective 51. The objective 51 focuses an image of the frame on the section of copy material 52 which rests on the platform 54.

The LCD display 49 is used to generate an unsharp mask for frames having too high a large-area contrast, that is, frames in which the contrast of larger areas is excessive. As opposed to the apparatus of FIG. 1, the unsharp mask of the LCD display 49 is optically superimposed on a frame to be masked.

Calculation of the mask is performed analogously to FIG. 1. An assembly 24 in FIG. 2 contains a converter and two memories which correspond to the converter 3 and memories 2, 4 of FIG. 1 while an assembly 28 includes an averaging unit, a memory, a density evaluating unit and a comparator which correspond to the averaging unit 5, the memory 6, the density evaluating unit 7 and the comparator 8 of FIG. 1. A third assembly 33 in FIG. 2 comprises a mask calculating unit, a computer, a calculator and two memories corresponding to the mask calculating unit 9, the computer 10, the calculator 12 and the memories 11, 13 of FIG. 1.

The assembly 33 is connected to the LCD display 49, and the mask calculated by the assembly 33 is generated in the display 49 under the direction of the assembly 33. The assembly 33 is also connected to an exposure control unit 30 which adjusts the color filters 45 and the shutter 46 in a conventional manner taking the mask into account.

To produce copies or prints which are qualitatively of high quality, the various components of a copying or printing apparatus must be properly matched to one another. For the apparatus of FIG. 1, this condition can be fulfilled by setting m equal to 40, K equal to 7, n equal to 50 and gamma equal to 0.5 as described earlier.

Assuming that copies having a size of 9 cm×13 cm are to be made from a conventional film of small format, two exemplary configurations which satisfy the preceding condition for the apparatus of FIG. 2 are as follows:

EXAMPLE 1

A mask is calculated using a value of 8 for m, a value of 7 for K, a value of 10 for n, and a value of 0.5 for gamma. The LCD display has 15,000 individually controllable points which can assume different shades of gray. The shade of gray for each point is established by averaging 16 intensity values. The distance between the film 40 and the mask generated in the LCD display is 13 mm. The diffusing disks 48 and 50 consist of glass plates, and one surface of each disk 48, 50 is given a matte finish by grinding with silicon carbide having a particle size of 1000. The ground surface of the diffusing disk 50 is located at a distance of 4.5 mm from the film 40 while the ground surface of the diffusing disk 48 is located at a distance of 19 mm from the film 40. The distance between the film 40 and the copy material 52 is 555 mm. The objective 51 has a relative aperture of 1/7.2 and is set to a magnification of 3.9.

EXAMPLE 2

The mask is calculated and formed as in Example 1 but the distance between the mask and the film 40 is 15 mm. The diffusing disks 48 and 50 each have an etched surface rather than a ground surface, and the etched surface of the disk 50 is located at a distance of 7 mm from the film 40 while the etched surface of the disk 48 is located at a distance of 22 mm from the film 40. The objective 51 has a relative aperture of 1/4.5.

The components of a copying apparatus are matched to one another with the help of one or more transparent reference masters or adjusting masters. Each reference master has two or more pairs of lines, and each line pair includes a light area or region as well as a dark area or region.

Figure 3:
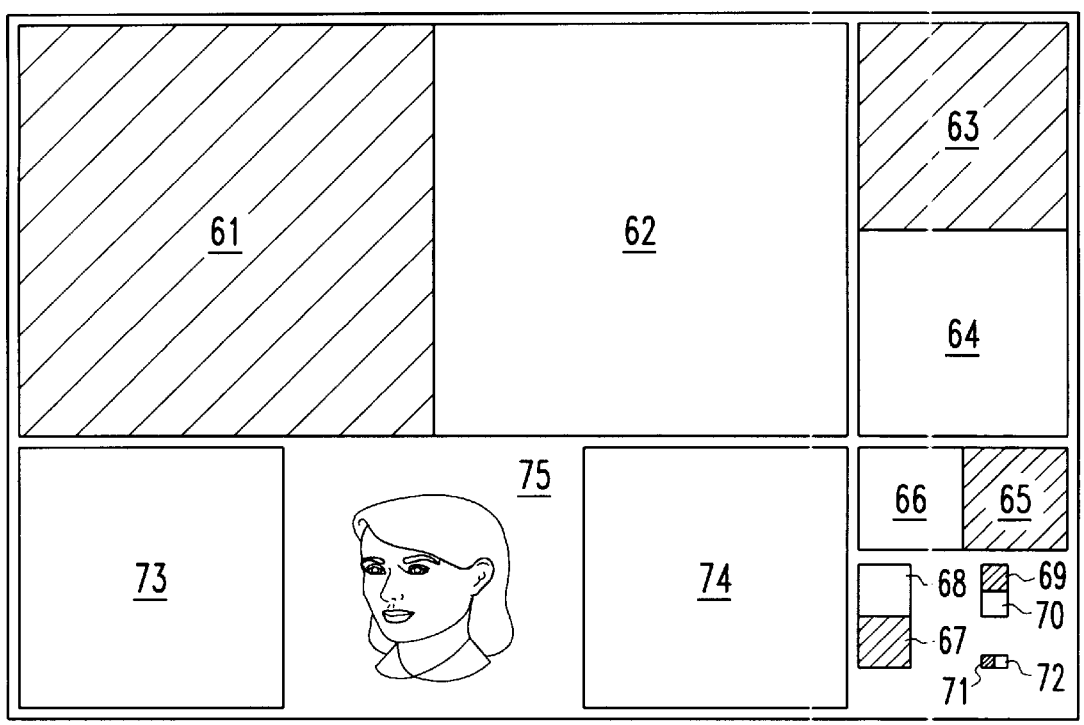
FIG. 3 shows a reference master for use in adjusting the apparatus of FIGS. 1 and 2.

One embodiment of a reference master is shown in FIG. 3. The reference master is rectangular and is provided with six line pairs. The light and dark areas of each line pair are square and have the same size although the sizes of the light and dark areas vary from line pair to line pair.

The largest line pair includes a dark area 61 and a light area 62 each having a width equal to 32% of the length of the diagonal of the reference master. A second line pair comprises a dark area 63 and a light area 64 whose widths are equal to 16% of the length of the diagonal of the reference master while a third line pair has a dark area 65 and a light area 66 whose widths equal 8% of the length of the diagonal of the reference master. A fourth line pair includes a dark area 67 and a light area 68 each having a width equal to 4% of the length of the diagonal of the reference master, and a fifth line pair comprises a dark area 69 and a light area 70 each having a width equal to 2% of the length of the diagonal of the reference master. The sixth and smallest line pair has a dark area 71 and a light area 72 whose widths equal 1% of the length of the diagonal of the reference master.

The reference master is further provided with a gray area or region 73 and an additional dark area or region 74. The gray area 73 and additional dark area 74 are of the same size, and each of the areas 73, 74 has a width equal to 20% of the length of the diagonal of the reference master.

The gray area 73 serves to establish the exposure conditions under which a copying apparatus is adjusted so that the components of the apparatus are matched to one another. To limit the density range of the reference master to the contrast of the defined areas, the density of the undefined background is made equal to the density of the gray area 73.

The additional dark area 74 is used as an indicator of whether or not a master needs to be masked for copying.

The reference master can also include an area or region 75 which may, for example, be provided with a portrait. This allows the reference master to be used for color adjustment.

When a copying apparatus is to be adjusted for the copying of a transparent negative, an appropriate reference master is selected and a mask is calculated. This mask has a predetermined overall density.

In the reference master, the largest pair of dark and light areas 61, 62 is designed so that the dark area 61 has an overall density equal to the mask density plus 0.8 while the light area 62 has an overall density equal to the mask density plus 0.5. The densities of the remaining pairs of dark and light areas 63, 64; 65, 66; 67, 68; 69, 70; and 71, 72 have a similar relationship. The gray area 73 has an overall density equal to the mask density plus 0.65 whereas the additional dark area 74 has an overall density which exceeds the mask density by 1.3 to 1.9.

The copying apparatus is now adjusted to establish copying parameters which cause a copy of the reference master to satisfy the following criteria:

1. The area of the copy corresponding to the gray area 73 of the reference master has a density of 0.8.

2. The difference in density between the areas of the copy corresponding to the largest dark and light areas 61, 62 of the reference master is less than the difference in density between the areas of the copy corresponding to the smallest dark and light areas 71, 72 of the reference master. It is preferred for the ratio of the first-mentioned density difference to the second-mentioned density difference to be less than 0.8.

When the copying apparatus has been adjusted so that a copy of the reference master satisfies these criteria, the components of the apparatus are properly matched to one another. A copy of the negative made with the same copying parameters used for the reference master will be of qualitatively high quality.

It is of advantage to provide a second reference master when the copying apparatus is to be adjusted for the copying of a negative. The densities of the areas 61–73 are the same in both reference masters while the density of the additional dark area 74 is different. In the second reference master, the overall density of the additional dark area 74 is less than the mask density plus 1.3, and preferably less than the mask density plus 1.2.

With the second reference master, the copying apparatus is adjusted to establish copying parameters such that a copy of the second reference master meets the following criteria:

1. The area of the copy corresponding to the gray area 73 of the second reference master has a density of 0.8.

2. The difference in density between the areas of the copy corresponding to the largest dark and light areas 61, 62 of the second reference master, divided by the difference in density between the areas of the copy corresponding to the smallest dark and light areas 71, 72 of the second reference master, is greater than 0.95. It is preferred for the ratio of the first-mentioned density difference to the second-mentioned density difference to be approximately 1.

When a copying apparatus is to be adjusted for the copying of a transparent diapositive, a suitable reference master is selected and a mask is calculated. The mask again has a predetermined overall density.

In the reference master, the largest pair of dark and light areas 61, 62 is designed so that the dark area 61 has an overall density equal to the mask density plus 1.5 while the light area 62 has an overall density equal to the mask density plus 0.5. The densities of the remaining pairs of dark and light areas 63, 64; 65, 66; 67, 68; 69, 70; and 71, 72 have a similar relationship. The gray area 73 has an overall density equal to the mask density plus 1.0 whereas the additional dark area 74 has an overall density which exceeds the mask density by 2.5 to 3.1.

The copying apparatus is now adjusted to establish copying parameters which cause a copy of the reference master to satisfy the following criteria:

1. The area of the copy corresponding to the gray area 73 of the reference master has a density of 0.8.

2. The difference in density between the areas of the copy corresponding to the largest dark and light areas 61, 62 of the reference master is less than the difference in density between the areas of the copy corresponding to the smallest dark and light areas 71, 72 of the reference master. It is preferred for the ratio of the first-mentioned density difference to the second-mentioned density difference to be less than 0.8.

When the copying apparatus has been adjusted so that a copy of the reference master satisfies these criteria, the components of the apparatus are properly matched to one another. A copy of the diapositive made with the same copying parameters used for the reference master will be of qualitatively high quality.

As is the case for a negative, it is of advantage to provide a second reference master when the copying apparatus is to be adjusted for the copying of a diapositive. The densities of the areas 61–73 are the same in both reference masters while the density of the additional dark area 74 is different. In the second reference master, the density of the additional dark area 74 is less than the mask density plus 2.5, and preferably less than the mask density plus 2.4.

With the second reference master, the copying apparatus is adjusted to establish copying parameters such that a copy of the second reference master meets the following criteria:

1. The area of the copy corresponding to the gray area 73 of the second reference master has a density of 0.8.

2. The difference in density between the areas of the copy corresponding to the largest dark and light areas 61, 62 of the second reference master, divided by the difference in density between the areas of the copy corresponding to the smallest dark and light areas 71, 72 of the second reference master, is greater than 0.95. It is preferred for the ratio of the first-mentioned density difference to the second-mentioned density difference to be approximately 1.

The terms "contrast of larger areas" and "large-area contrast" refer to areas approximately the size of the additional dark area 74.

The invention makes it possible to produce high-quality copies from transparent masters exhibiting large variations in brightness.

Various modifications can be made within the meaning and range of equivalence of the appended claims.

We claim:

1. A method of copying transparent masters, comprising the steps of providing at least one reference master having a film mask of predetermined density, said one reference master having a diagonal of predetermined length, a first pair of light and dark areas, and a second pair of light and dark areas, each area of said first pair having a width equal or approximately equal to a first percentage of said predetermined length, and each area of said second pair having a width equal or approximately equal to a second percentage of said predetermined length which is smaller than said first percentage, said dark areas of said first and second pairs each having a density equal or approximately equal to the sum of said predetermined density and a first addend, and said light areas of said first and second pairs each having a density equal or approximately equal to the sum of said predetermined density and a second addend which is smaller than said first addend; and establishing copying parameters such that, in a copy of said one reference master made with said copying parameters, a first density difference is smaller than a second density difference, said first density difference being the density difference between areas of said copy corresponding to said areas of said first pair, and said second density difference being the density difference between areas of said copy corresponding to said areas of said second pair.

2. The method of claim 1, wherein said one reference master further comprises a gray area having a width equal or approximately equal to a third percentage of said predetermined length and a density equal or approximately to said predetermined density plus a third addend, said first percentage being 32%, said second percentage being 1%, said third percentage being 20%, said first addend being 0.8, said second addend being 0.5, and said third addend being 0.65, said copying parameters being such that: (i) an area of said copy corresponding to said gray area has a density equal or approximately equal to 0.8; and (ii) the ratio of said first density difference to said second density difference is equal to or less than 0.8.

3. The method of claim 2, wherein said one reference master includes another dark area having a width equal or approximately equal to the width of said gray area, said other dark area having a density which exceeds said predetermined density by approximately 1.3 to approximately 1.9.

4. The method of claim 1, wherein said one reference master further comprises a gray area having a width equal or approximately equal to a third percentage of said predetermined length and a density equal or approximately equal to said predetermined density plus a third addend, said first percentage being 32%, said second percentage being 1%, said third percentage being 20%, said first addend being 1.5, said second addend being 0.5, and said third addend being 1.0, said copying parameters being such that: (i) an area of said copy corresponding to said gray area has a density equal or approximately equal to 0.8; and (ii) the ratio of said first density difference to said second density difference is equal to or less than 0.8.

5. The method of claim 4, wherein said one reference master includes another dark area having a width equal or approximately equal to the width of said gray area, said other dark area having a density which exceeds said predetermined density by approximately 2.5 to approximately 3.1.

6. The method of claim 1, further comprising the steps of: providing an additional reference master having a diagonal of additional predetermined length, an additional first pair of light and dark areas, and an additional second pair of light and dark areas, each area of said additional first pair having a width equal or approximately equal to an additional first percentage of said additional predetermined length, and each area of said additional second pair having a width equal or approximately equal to an additional second percentage of said additional predetermined length which is smaller than said additional first percentage, said dark areas of said additional first and second pairs each having a density equal or approximately equal to the sum of said predetermined density and an additional first addend, and said light areas of said additional first and second pairs each having a density equal or approximately equal to the sum of said predetermined density and an additional second addend which is smaller than said additional first addend; and establishing additional copying parameters such that, in an additional copy of said additional reference master made with said additional copying parameters, the ratio of an additional first density difference to an additional second density difference is equal to or greater than 0.95, said additional first density difference being the density difference between areas of said additional copy corresponding to said areas of said additional first pair, and said additional second density difference being the density difference between areas of said additional copy corresponding to said areas of said additional second pair.

7. The method of claim 6, wherein said one reference master comprises another dark area having a density greater than the sum of said predetermined density and a predetermined addend, said additional reference master including an additional dark area having a density equal to or less than the sum of said predetermined density and said predetermined addend.

8. The method of claim 7, wherein said additional reference master further comprises a gray area having a width equal or approximately equal to a selected percentage of said predetermined length and a density equal or approximately equal to said predetermined density plus a selected addend, said additional first percentage being 32%, said additional second percentage being 1%, said selected percentage being 20%, said additional first addend being 0.8, said additional second addend being 0.5, said selected addend being 0.65, and said predetermined addend being 1.2, said additional dark area having a width equal or approximately equal to the width of said gray area, and said additional copying parameters being such that an area of said additional copy corresponding to said gray area has a density equal or approximately equal to 0.8.

9. The method of claim 7, wherein said additional reference master further comprises a gray area having a width equal or approximately equal to a selected percentage of said predetermined length and a density equal or approximately equal to said predetermined density plus a selected addend, said additional first percentage being 32%, said additional second percentage being 1%, said selected percentage being 20%, said additional first addend being 1.5, said additional second addend being 0.5, said selected addend being 1.0, and said predetermined addend being 2.4, said additional dark area having a width equal or approximately equal to the width of said gray area, and said copying parameters being such that an area of said additional copy corresponding to said gray area has a density equal or approximately equal to 0.8.

10. A method of copying transparent masters, comprising the steps of providing at least one reference master having a film mask of predetermined density, said one reference master having a diagonal of predetermined length, a first pair of light and dark areas, and a second pair of light and dark areas, each area of said first pair having a width equal or approximately equal to a first percentage of said predetermined length, and each area of said second pair having a width equal or approximately equal to a second percentage of said predetermined length which is smaller than said first percentage, said dark areas of said first and second pairs each having a density equal or approximately equal to the sum of said predetermined density and a first addend, and said light areas of said first and second pairs each having a density equal or approximately equal to the sum of said predetermined density and a second addend which is smaller than said first addend; and establishing copying parameters such that, in a copy of said one reference master made with said copying parameters, the ratio of a first density difference to a second density difference is equal to or greater than 0.95, said first density difference being the density difference between areas of said copy corresponding to said areas of said first pair, and said second density difference being the density difference between areas of said copy corresponding to said areas of said second pair.

11. The method of claim 10, wherein said one reference master comprises another dark area having a density equal to or less than the sum of said predetermined density and a predetermined addend.

12. The method of claim 11, wherein said one reference master further comprises a gray area having a width equal or approximately equal to a third percentage of said predetermined length and a density equal or approximately equal to said predetermined density plus a third addend, said first percentage being 32%, said second percentage being 1%, said third percentage being 20%, said first addend being 0.8, said second addend being 0.5, said third addend being 0.65, and said predetermined addend being 1.2, said other dark area having a width equal or approximately equal to the width of said gray area, and said copying parameters being such that an area of said copy corresponding to said gray area has a density equal or approximately equal to 0.8.

13. The method of claim 11, wherein said one reference master further comprises a gray area having a width equal or approximately equal to a third percentage of said predetermined length and a density equal or approximately equal to said predetermined density plus a third addend, said first percentage being 32%, said second percentage being 1%, said third percentage being 20%, said first addend being 1.5, said second addend being 0.5, said third addend being 1.0, and said predetermined addend being 2.4, said other dark area having a width equal or approximately equal to the width of said gray area, and said copying parameters being such that an area of said copy corresponding to said gray area has a density equal or approximately equal to 0.8.

14. A method of manipulating at least one component of an apparatus preparatory to using the apparatus for the copying of transparent masters, said method comprising the steps of providing at least one reference master having a film mask of predetermined density, said one reference master having a diagonal of predetermined length, a first pair of light and dark areas, and a second pair of light and dark areas, each area of said first pair having a width equal or approximately equal to a first percentage of said predetermined length, and each area of said second pair having a width equal or approximately equal to a second percentage of said predetermined length which is smaller than said first percentage, said dark areas of said first and second pairs each having a density equal or approximately equal to the sum of said predetermined density and a first addend, and said light areas of said first and second pairs each having a density equal or approximately equal to the sum of said predetermined density and a second addend which is smaller than said first addend; and adjusting said one component such that, in a copy of said one reference master made following the adjusting step, a first density difference is smaller than a second density difference, said first density difference being the density difference between areas of said copy corresponding to said areas of said first pair, and said second density difference being the density difference between areas of said copy corresponding to said areas of said second pair.

15. The method of claim 14, wherein said one reference master further comprises a gray area having a width equal or approximately equal to a third percentage of said predetermined length and a density equal or approximately equal to said predetermined density plus a third addend, said first percentage being 32%, said second percentage being 1%, said third percentage being 20%, said first addend being 0.8, said second addend being 0.5, and said third addend being 0.65, the adjusting step being performed such that: (i) an area of said copy corresponding to said gray area has a density equal or approximately equal to 0.8; and (ii) the ratio of said first density difference to said second density difference is equal to or less than 0.8.

16. The method of claim 15, wherein said one reference master includes another dark area having a width equal or approximately equal to the width of said gray area, said other dark area having a density which exceeds said predetermined density by approximately 1.3 to approximately 1.9.

17. The method of claim 14, wherein said one reference master further comprises a gray area having a width equal or approximately equal to a third percentage of said predetermined length and a density equal or approximately equal to said predetermined density plus a third addend, said first percentage being 32%, said second percentage being 1%, said third percentage being 20%, said first addend being 1.5, said second addend being 0.5, and said third addend being 1.0, the adjusting step being performed such that: (i) an area of said copy corresponding to said gray area has a density equal or approximately equal to 0.8; and (ii) the ratio of said first density difference to said second density difference is equal to or less than 0.8.

18. The method of claim 17, wherein said one reference master includes another dark area having a width equal or approximately equal to the width of said gray area, said other dark area having a density which exceeds said predetermined density by approximately 2.5 to approximately 3.1.

19. The method of claim 14, further comprising the steps of: providing an additional reference master having a diagonal of additional predetermined length, an additional first pair of light and dark areas, and an additional second pair of light and dark areas, each area of said additional first pair having a width equal or approximately equal to an additional first percentage of said additional predetermined length, and each area of said additional second pair having a width equal or approximately equal to an additional second percentage of said additional predetermined length which is smaller than said additional first percentage, said dark areas of said additional first and second pairs each having a density equal or approximately equal to the sum of said predetermined density and an additional first addend, and said light areas of said additional first and second pairs each having a density equal or approximately equal to the sum of said predetermined density and an additional second addend which is smaller than said additional first addend; and additionally adjusting said one component such that, in an additional copy of said additional reference master made following the step of additionally adjusting said one component, the ratio of an additional first density difference to an additional second density difference is equal to or greater than 0.95, said additional first density difference being the density difference between areas of said additional copy corresponding to said areas of said additional first pair, and said additional second density difference being the density difference between areas of said additional copy corresponding to said areas of said additional second pair.

20. The method of claim 19, wherein said one reference master comprises another dark area having a density greater than the sum of said predetermined density and a predetermined addend, said additional reference master including an additional dark area having a density equal to or less than the sum of said predetermined density and said predetermined addend.

21. The method of claim 20, wherein said additional reference master further comprises a gray area having a width equal or approximately equal to a selected percentage of said predetermined length and a density equal or approximately equal to said predetermined density plus a selected addend, said additional first percentage being 32%, said additional second percentage being 1%, said selected percentage being 20%, said additional first addend being 0.8, said additional second addend being 0.5, said selected addend being 0.65, and said predetermined addend being 1.2, said additional dark area having a width equal or approximately equal to the width of said gray area, and the step of additionally adjusting said one component being performed such that an area of said additional copy corresponding to said gray area has a density equal or approximately equal to 0.8.

22. The method of claim 20, wherein said additional reference master further comprises a gray area having a width equal or approximately equal to a selected percentage of said predetermined length and a density equal or approximately equal to said predetermined density plus a selected addend, said additional first percentage being 32%, said additional second percentage being 1%, said selected percentage being 20%, said additional first addend being 1.5, said additional second addend being 0.5, said selected addend being 1.0, and said predetermined addend being 2.4, said additional dark area having a width equal or approximately equal to the width of said gray area, and the step of additionally adjusting said one component being performed such that an area of said additional copy corresponding to said gray area has a density equal or approximately equal to 0.8.

23. A method of manipulating at least one component of an apparatus preparatory to using the apparatus for the copying of transparent masters, said method comprising the steps of providing at least one reference master having a film mask of predetermined density, said one reference master having a diagonal of predetermined length, a first pair of light and dark areas, and a second pair of light and dark areas, each area of said first pair having a width equal or approximately equal to a first percentage of said predetermined length, and each area of said second pair having a width equal or approximately equal to a second percentage of said predetermined length which is smaller than said first percentage, said dark areas of said first and second pairs each having a density equal or approximately equal to the sum of said predetermined density and a first addend, and said light areas of said first and second pairs each having a density equal or approximately equal to the sum of said predetermined density and a second addend which is smaller than said first addend; and adjusting said one component such that, in a copy of said one reference master made following the adjusting step, the ratio of a first density difference to a second density difference is equal to or greater than 0.95, said first density difference being the density difference between areas of said copy corresponding to said areas of said first pair, and said second density difference being the density difference between areas of said copy corresponding to said areas of said second pair.

24. The method of claim 23, wherein said one reference master comprises another dark area having a density equal to or less than the sum of said predetermined density and a predetermined addend.

25. The method of claim 24, wherein said one reference master further comprises a gray area having a width equal or approximately equal to a third percentage of said predetermined length and a density equal or approximately equal to said predetermined density plus a third addend, said first percentage being 32%, said second percentage being 1%, said third percentage being 20%, said first addend being 0.8, said second addend being 0.5, said third addend being 0.65, and said predetermined addend being 1.2, said other dark area having a width equal or approximately equal to the width of said gray area, and the adjusting step being performed such that an area of said copy corresponding to said gray area has a density equal or approximately equal to 0.8.

26. The method of claim 24, wherein said one reference master further comprises a gray area having a width equal or approximately equal to a third percentage of said predetermined length and a density equal or approximately equal to said predetermined density plus a third addend, said first percentage being 32%, said second percentage being 1%, said third percentage being 20%, said first addend being 1.5, said second addend being 0.5, said third addend being 1.0, and said predetermined addend being 2.4, said other dark area having a width equal or approximately equal to the width of said gray area, and the adjusting step being performed such that an area of said copy corresponding to said gray area has a density equal or approximately equal to 0.8.

27. A system for copying transparent masters, comprising means for generating copies of masters, said generating means being adjusted so that copies of a selected reference master having a film mask of predetermined density generated by said generating mean having at least one selected characteristic, the selected reference master having a diagonal of predetermined length, a first pair of light and dark areas, and a second pair of light and dark areas, each area of the first pair having a width equal or approximately equal to a first percentage of the predetermined length, and each area of the second pair having a width equal or approximately equal to a second percentage of the predetermined length which is smaller than the first percentage, the dark areas of the first and second pairs each having a density equal or approximately equal to the sum of the predetermined density and a first addend, and the light areas of the first and second pairs each having a density equal or approximately equal to the sum of the predetermined density and a second addend which is smaller than the first addend, said generating means being adjusted such that, in a copy of the selected reference master generated by said generating means, a first density difference is smaller than a second density difference, said first density difference being the density difference between areas of the copy corresponding to the areas of the first pair, and the second density difference being the density difference between areas of the copy corresponding to the areas of the second pair.

28. The system of claim 27, wherein the selected reference master further comprises a gray area having a width equal or approximately equal to a third percentage of the predetermined length, and another dark area having a width equal or approximately equal to the width of the gray area, the gray area having a density equal or approximately equal to the predetermined density plus a third addend, and the other dark area having a density which exceeds the predetermined density by approximately 1.3 to approximately 1.9, the first percentage being 32%, the second percentage being 1%, the third percentage being 20%, the first addend being 0.8, the second addend being 0.5, and the third addend being 0.65, said generating means being adjusted such that: (i) an area of the copy corresponding to the gray area has a density equal or approximately equal to 0.8; and (ii) the ratio of the first density difference to the second density difference is equal to or less than 0.8.

29. The system of claim 27, wherein the selected reference master further comprises a gray area having a width equal or approximately equal to a third percentage of the predetermined length, and another dark area having a width equal or approximately equal to the width of the gray area, the gray area having a density equal or approximately equal to the predetermined density plus a third addend, and the other dark area having a density which exceeds the predetermined density by approximately 2.5 to approximately 3.1, the first percentage being 32%, the second percentage being 1%, the third percentage being 20%, the first addend being 1.5, the second addend being 0.5, and the third addend being 1.0, said generating means being adjusted such that: (i) an area of the copy corresponding to the gray area has a density equal or approximately equal to 0.8; and (ii) the ratio of the first density difference to the second density difference is equal to or less than 0.8.

30. The system of claim 27, wherein said generating means is adjustable so that copies of an additional reference master generated by said generating means have an additional selected characteristic, the additional reference master having a diagonal of additional predetermined length, an additional first pair of light and dark areas, and an additional second pair of light and dark areas, each area of the additional first pair having a width equal or approximately equal to an additional first percentage of the additional predetermined length, and each area of the second pair having a width equal or approximately equal to an additional second percentage of the additional predetermined length which is smaller than the additional first percentage, the dark areas of the additional first and second pairs each having a density equal or approximately equal to the sum of the predetermined density and an additional first addend, and the light areas of the additional first and second pairs each having a density equal or approximately equal to the sum of the predetermined density and an additional second addend which is smaller than the additional first addend, said generating means being adjustable such that, in an additional copy of the additional reference master generated by said generating means, the ratio of an additional first density difference to an additional second density difference is equal to or greater than 0.95, the additional first density difference being the density difference between areas of the additional copy corresponding to the areas of the additional first pair, and the additional second density difference being the density difference between areas of the additional copy corresponding to the areas of the additional second pair.

31. The system of claim 30, wherein the additional reference master further comprises a gray area having a width equal or approximately equal to a selected percentage of the additional predetermined length, and an additional dark area having a width equal or approximately equal to the width of the gray area, the gray area having a density equal or approximately equal to the predetermined density plus a selected addend, and the additional dark area having a density equal to or less than the sum of the predetermined density and a predetermined addend, the additional first percentage being 32%, the additional second percentage being 1%, the selected percentage being 20%, the additional first addend being 0.8, the additional second addend being 0.5, the selected addend being 0.65, and the predetermined addend being 1.2, said generating means being adjustable such that an area of the additional copy corresponding to the gray area has a density equal or approximately equal to 0.8.

32. The system of claim 30, wherein the additional reference master further comprises a gray area having a width equal or approximately equal to a selected percentage of the predetermined length, and an additional dark area having a width equal or approximately equal to the width of the gray area, the gray area having a density equal or approximately equal to the predetermined density plus a selected addend, and the additional dark area having a density equal to or less than the sum of the predetermined density and a predetermined addend, the additional first percentage being 32%, the additional second percentage being 1%, the selected percentage being 20%, the additional first addend being 1.5, the additional second addend being 0.5, the selected addend being 1.0, and the predetermined addend being 2.4, said generating means being adjustable such that an area of the additional copy corresponding to the gray area has a density equal or approximately equal to 0.8.

33. A system for copying transparent masters, comprising means for generating copies of masters, said generating means including means for establishing a mask of predetermined density; and means for generating copies of masters, said generating means being adjusted so that copies of a reference master generated by said generating means have a selected characteristic, the selected reference master having a diagonal of predetermined length, a first pair of light and dark areas, and a second pair of light and dark areas, each area of the first pair having a width equal or approximately equal to a first percentage of the predetermined length, and each area of the second pair having a width equal or approximately equal to a second percentage of the predetermined length which is smaller than the first percentage, the dark areas of the first and second pairs each having a density equal or approximately equal to the sum of the predetermined density and a first addend, and the light areas of the first and second pairs each having a density equal or approximately equal to the sum of the predetermined density and a second addend which is smaller than the first addend, said generating means being adjusted such that, in a copy of the selected reference master generated by said generating means, the ratio of a first density difference to a second density difference is equal to or greater than 0.95, the first density difference being the density difference between areas of the copy corresponding to the areas of the first pair, and the second density difference being the density difference between areas of the copy corresponding to the areas of the second pair.

34. The system of claim 33, wherein the selected reference master further comprises a gray area having a width equal or approximately equal to a third percentage of the predetermined length, and another dark area having a width equal or approximately equal to the width of the gray area, the gray area having a density equal or approximately equal to the predetermined density plus a third addend, and the other dark having a density equal to or less than the sum of the predetermined density and a predetermined addend, the first percentage being 32%, the second percentage being 1%, the third percentage being 20%, the first addend being 0.8, the second addend being 0.5, the third addend being 0.65, and the predetermined addend being 1.2, said generating means being adjusted such that an area of the copy corresponding to the gray area has a density equal or approximately equal to 0.8.

35. The system of claim 33, wherein the selected reference master further comprises a gray area having a width equal or approximately equal to a third percentage of the predetermined length, and another dark area having a width equal or approximately equal to the width of the gray area, the gray area having a density equal or approximately equal to the predetermined density plus a third addend, and the other dark area having a density equal to or less than the sum of the predetermined density and a predetermined addend, the first percentage being 32%, the second percentage being 1%, the third percentage being 20%, the first addend being 1.5, the second addend being 0.5, the third addend being 1.0, and the predetermined addend being 2.4, said generating means being adjusted such that an area of the copy corresponding to the gray area has a density equal or approximately equal to 0.8.

* * * * *